April 21, 1931.   L. E. WOOD   1,802,101
MOLDED ARTICLE
Filed Nov. 4, 1924   3 Sheets-Sheet 1
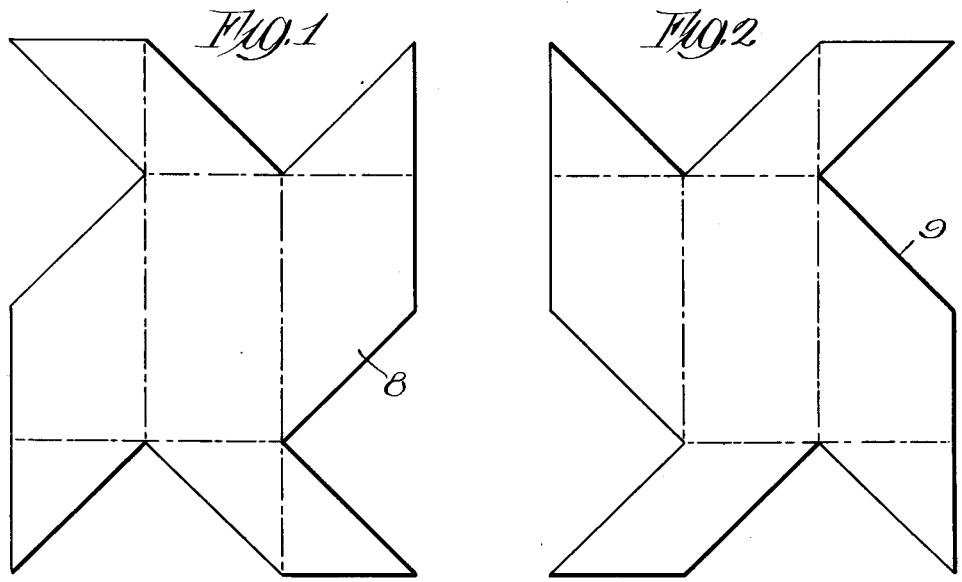
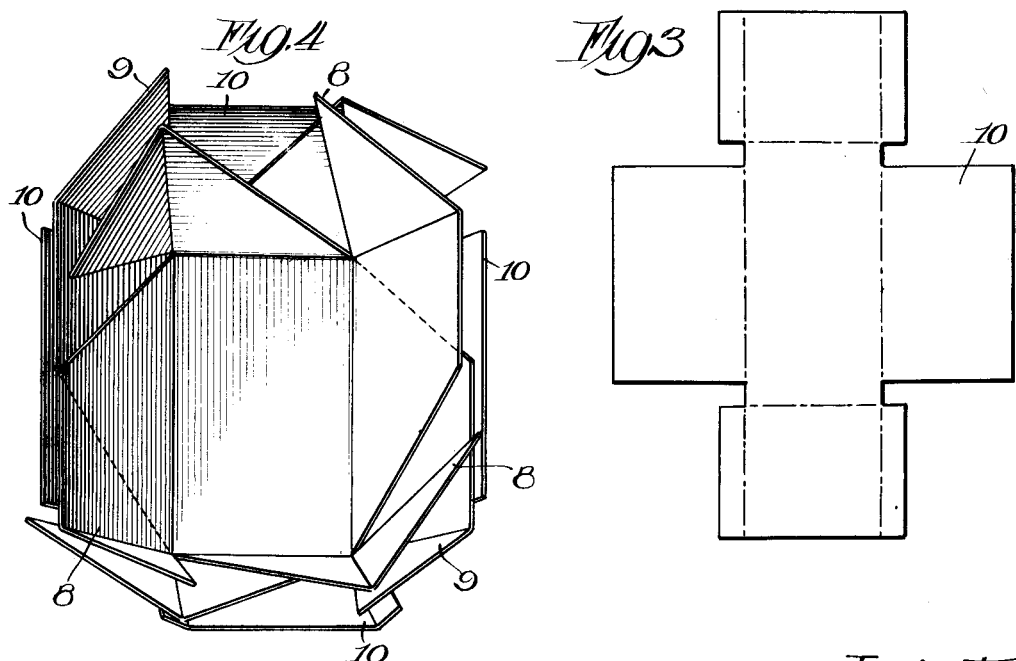
Inventor
Lloyd E. Wood
by [signature]
Atty.

April 21, 1931.  L. E. WOOD  1,802,101
MOLDED ARTICLE
Filed Nov. 4, 1924  3 Sheets-Sheet 2
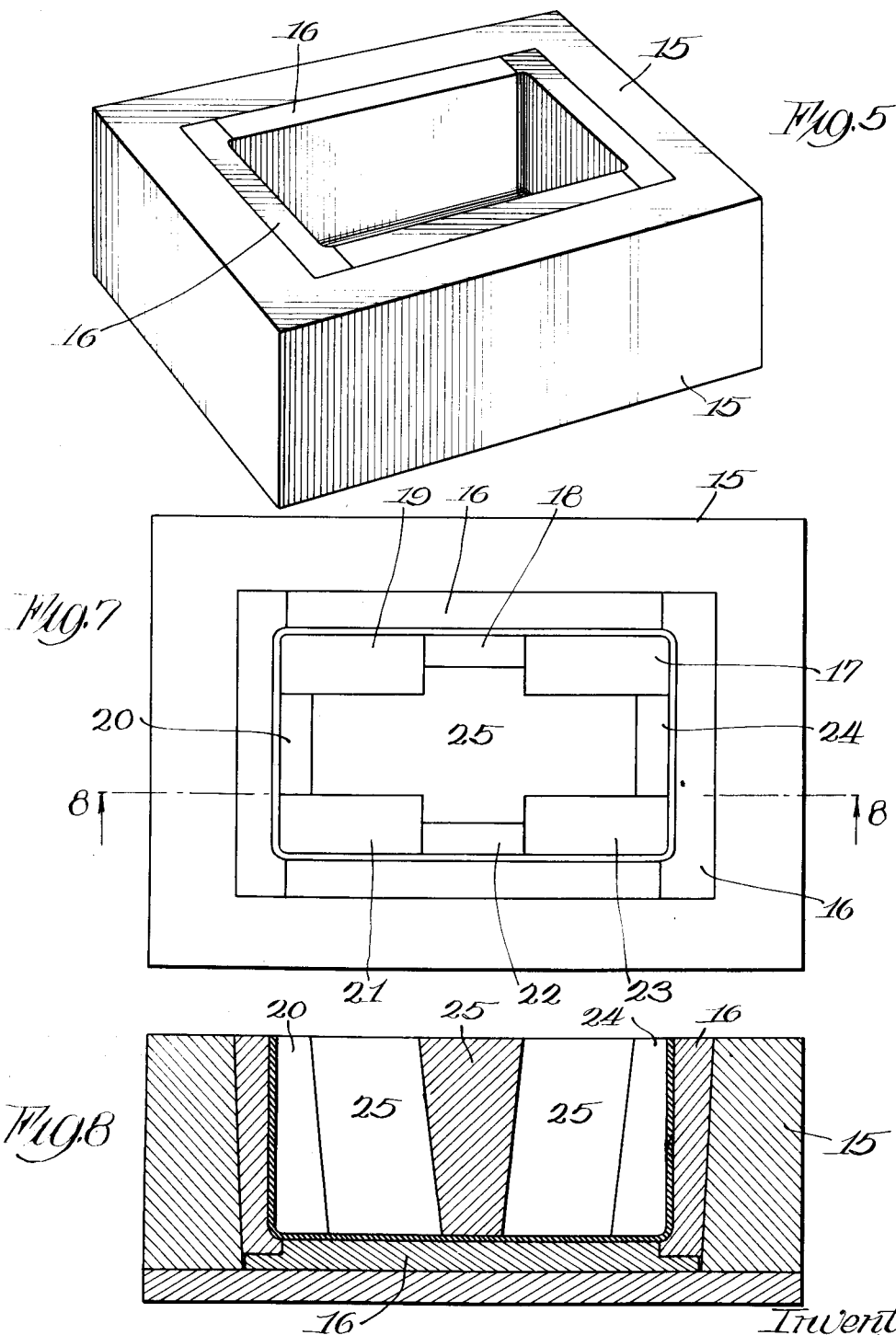

April 21, 1931.  L. E. WOOD  1,802,101
MOLDED ARTICLE
Filed Nov. 4, 1924   3 Sheets-Sheet 3
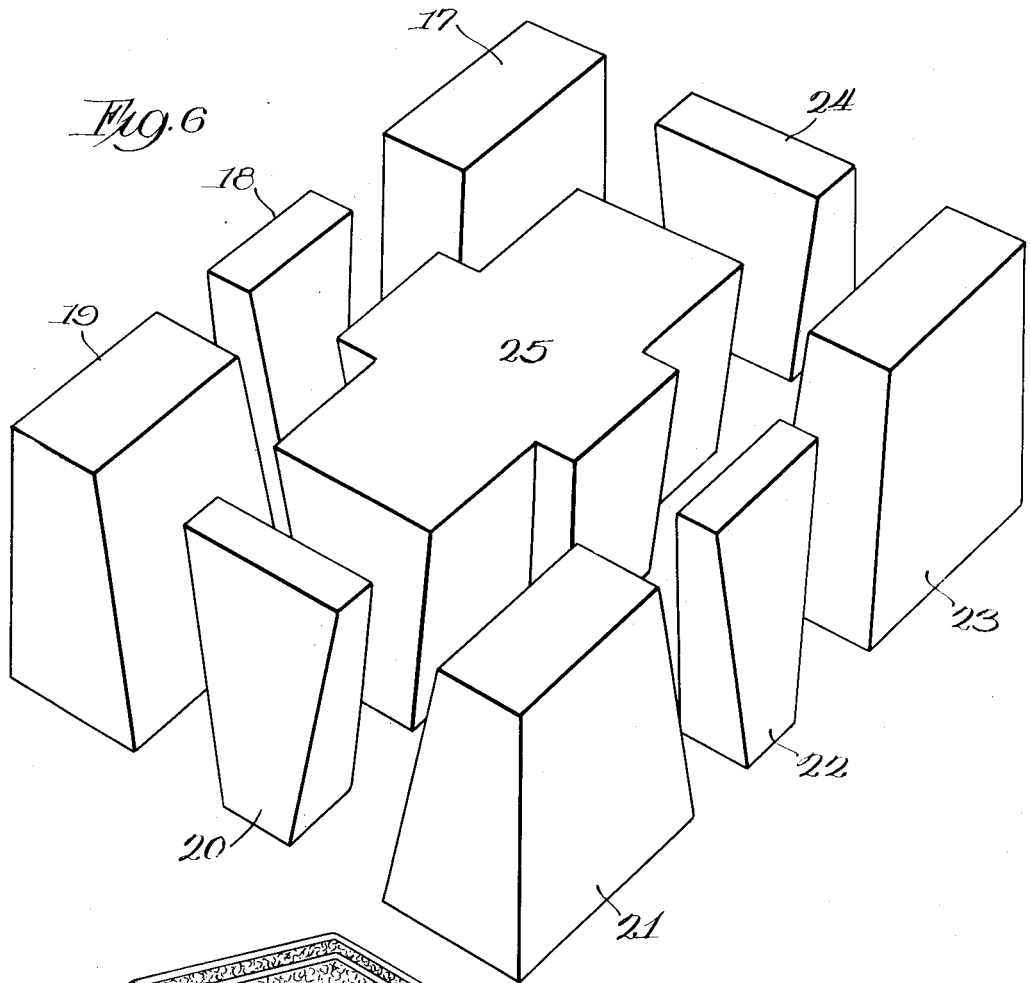
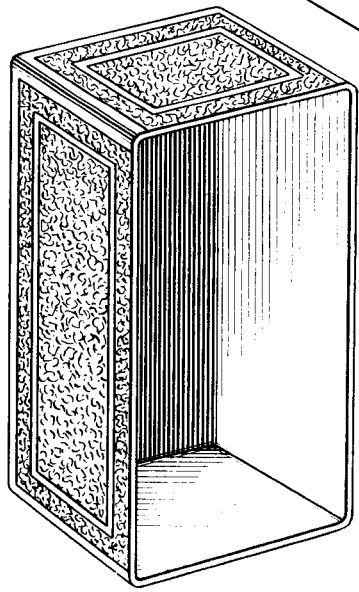
Inventor
Lloyd E. Wood
by H. A. Patterson
Atty.

Patented Apr. 21, 1931

1,802,101

UNITED STATES PATENT OFFICE

LLOYD EMMONS WOOD, OF CHICAGO, ILLINOIS, ASSIGNOR TO WESTERN ELECTRIC COMPANY, INCORPORATED, OF NEW YORK, N. Y., A CORPORATION OF NEW YORK

MOLDED ARTICLE

Application filed November 4, 1924. Serial No. 747,770.

This invention relates to molded articles, and more particularly to an article formed from synthetic resinous materials.

One object of the invention is to produce an improved light, strong, and hollow article having a pleasing finish.

According to the main features of the invention a plurality of blanks having extending portions are formed of sheet material which has been treated with a substance such as a synthetic resin which can be cured by heat and pressure; the blanks are folded, the extending portions of the different blanks being overlapped to form the hollow article desired, and interlocked by curing the resin, the curing being effected by subjecting the assembled blanks to heat and pressure. A die member having a plurality of sections is provided to cause an equal pressure in all directions on the article within a die block as the resin is being cured. Simultaneously configurated surfaces are molded on the outside faces of the hollow article by removable finishing plates with which the die block is lined.

Other features of the invention will become apparent from the following description taken with the accompanying drawings, showing a specific embodiment of the invention in one form of an article and the apparatus for producing it, in which Fig. 1 is a section of laminated material blanked to the proper size and shape for producing the hollow article;

Fig. 2 is another type of blank which is employed with the blank shown in Fig. 1;

Fig. 3 a still differently shaped blank which may be used to form the outside lamination of the hollow article;

Fig. 4 represents the manner in which the blanks are arranged prior to the molding thereof;

Fig. 5 is a perspective view of the die block in which the article is molded showing the removable finishing plates with which the die block is lined;

Fig. 6 illustrates in perspective the component parts of a sectional die compression member;

Fig. 7 is a plan view showing the die block, the removable finishing plates and the assembled sectional compression member, the hollow article being shown between the finishing plates and the sectional compression member;

Fig. 8 is a sectional view taken along the line 8—8 of Fig. 7, and

Fig. 9 is a perspective view of the finished article.

Referring now more particularly to the attached drawings in which like numerals are employed to designate similar members throughout the several views, a plurality of blanks 8, 9, and 10 are provided and are so formed that when folded along the lines which are shown as dotted in Figs. 1, 2, and 3, they will assume a box-like shape without overlapping. They are arranged with right blanks 8 and left blanks 9 adjacent one to the other so that the lines where the extending portions of successive blanks meet will not coincide. These blanks may be made from any sheet material, but good results may be obtained by employing canvas in the blanks 8 and 9 shown in Figs. 1 and 2 while the blank 10 represented in Fig. 3 which is placed on the outside of the beforementioned blanks is made of paper. All of these blanks are impregnated in any suitable manner with a material such as phenolformaldehyde or other synthetic resinous material which can be rendered both infusible and insoluble by the application of heat and pressure. The outside face of the paper blank is further treated with the curable resin by applying thereto a plastic comprising a synthetic resin and a suitable filler so as to form a somewhat thick coating on the outside. The sheet material may be treated with the synthetic resin when in the form of a large sheet, or the individual blanks, after being cut out, may be so treated.

When the hollow article has been built up from laminations in the manner described, it is molded by subjecting it to heat and pressure to produce the final condensation product in a die which will now be described.

A die block or yoke 15 is provided with removable plates 16 and on the faces of these plates which will come in contact with the article a configurated design such as a design to imitate pebble grain leather is etched. The opposite face is tapered to correspond to the taper of the die block 15. A sectional compression member comprises eight wedge-like sections 17 to 24, inclusive, and a cross shaped member 25, all of these members being so arranged that when the sections 17 to 24, inclusive, are placed in position and the cross shaped section 25 inserted, a pressure thereon will cause a uniform compression in every part of the die.

The hollow article is completed through the curing of the synthetic resin. This may be accomplished by placing the laminations which have been arranged in the manner described and as shown in Fig. 4 inside of the die block 15 after the finishing plates 16 have been inserted therein. The die block is heated either before or after the blanks are placed in position, and as soon as the blanks are hot enough to become plastic and compressible the wedge-like members 17 to 24, having been first placed within the interior of the folded laminations, the cross-like member 25 is inserted and forced down by suitable means to cause a uniform pressure on all parts of the hollow article. The entire die is then heated to the temperature that is required to change the material with which the laminations are treated into the final condensation product, and during the heating of the die the member 25 is held in position in any suitable manner to cause a continuous and constant pressure to be exerted uniformly throughout the material.

The temperature and pressure and the duration thereof may be varied considerably, but uniformly good results may be obtained by employing a pressure of about 1500 pounds per square inch and a temperature of 350° F. for about 10 minutes. When the article has been completely cured and cooled it is removed by first removing from the die block all of the assembly, including the article and the finishing plates, then removing the compression member from the interior of the box, a section at a time being removed. By removing the finishing plates with the hollow article in this manner the danger of injury to the finish by friction against the sides of the die block is avoided.

An article produced in this manner may be used for many purposes. The particular shape of the article shown in the drawings may be used as a carrying case for an audiphone or deaf set.

Although the invention has been described in detail in connection with one embodiment, it is obvious that it is not to be limited thereto, but that its limits are to be defined only by the scope of the appended claims.

What is claimed is:

1. In a new article of manufacture, a hollow receptacle comprising a sheet formed to provide a bottom, side, and end sections of the receptacle with the side sections shorter than the bottom section and with extensions on the end sections formed to meet the edges of the side sections along vertical lines, a second sheet arranged to have a bottom, side, and end sections, the latter sections being formed by cutting the material on a diagonal in opposite directions and abutting the diagonally cut edges, and the sheets being arranged one within the other and united with each other.

2. In a new article of manufacture, a hollow receptacle comprising a sheet formed to provide a bottom, side, and end sections with its edges cut on a line perpendicular with the outer edges, a second sheet having V-shaped portions removed with the point of the V's extending to each of the actual corners of the receptacle, and the sheets being arranged one within the other and formed to bring the edges of each sheet into abutting relation forming a laminated receptacle.

3. In a new article of manufacture, a hollow receptacle comprising a sheet having V-shaped portions removed with the point of the V's terminating in each of the actual corners of the receptacle, a second sheet having V-shaped portions removed with the point of the V's terminating in each of the actual corners of the receptacle but extending in directions differently from those of the first sheet, and a third sheet cut with the edges perpendicular to the sides formed with said sheets to provide a receptacle with the sheets joined with the edges of each sheet in abutting relation.

In witness whereof, I hereunto subscribe my name this 21st day of October, A. D. 1924.

LLOYD EMMONS WOOD.